United States Patent
Donovan et al.

(10) Patent No.: US 10,361,942 B2
(45) Date of Patent: Jul. 23, 2019

(54) SYSTEM FOR ALLOCATION OF RESOURCES BASED ON RESOURCE UTILIZATION

(71) Applicant: BANK OF AMERICA CORPORATION, Charlotte, NC (US)

(72) Inventors: Shelly S. Donovan, Richmond, VA (US); David A. Armstrong, Bel Air, MD (US); Paul A. Bryce, Jacksonville, FL (US); Rein Hofstra, Jacksonville, FL (US)

(73) Assignee: Bank of America Corporation, Charlotte, NC (US)

( * ) Notice: Subject to any disclaimer, the term of this patent is extended or adjusted under 35 U.S.C. 154(b) by 257 days.

(21) Appl. No.: 15/092,199

(22) Filed: Apr. 6, 2016

(65) Prior Publication Data

US 2017/0250885 A1   Aug. 31, 2017

Related U.S. Application Data

(60) Provisional application No. 62/300,227, filed on Feb. 26, 2016.

(51) Int. Cl.
| | |
|---|---|
| *G06F 15/173* | (2006.01) |
| *H04L 12/26* | (2006.01) |
| *H04L 29/08* | (2006.01) |
| *H04L 12/24* | (2006.01) |

(52) U.S. Cl.
CPC .......... *H04L 43/16* (2013.01); *H04L 41/5032* (2013.01); *H04L 43/065* (2013.01); *H04L 43/0817* (2013.01); *H04L 67/22* (2013.01)

(58) Field of Classification Search
USPC ......................... 709/224, 226, 223, 214, 211
See application file for complete search history.

(56) References Cited

U.S. PATENT DOCUMENTS

| | | | | |
|---|---|---|---|---|
| 9,081,623 | B1* | 7/2015 | Magerramov | G06F 9/50 |
| 2016/0029291 | A1* | 1/2016 | Khalil | H04W 48/02 |
| | | | | 455/26.1 |
| 2017/0149686 | A1* | 5/2017 | Marshall | H04L 47/762 |

* cited by examiner

*Primary Examiner* — Lan Dai T Truong
(74) *Attorney, Agent, or Firm* — Michael A. Springs; Moore & Van Allen PLLC; Anup Shrinivasan

(57) ABSTRACT

Embodiments of the invention are directed to systems, methods, and computer program products for allocation of resources based on resource utilization. The system is configured to electronically receive information associated with a user, wherein the information comprises a primary user profile; determine one or more actions associated with the primary user profile, wherein the one or more actions are to be executed by the user; determine one or more resources required to execute the one or more actions based on at least the primary user profile; and assign the one or more resources to the user based on at least the primary user profile associated with the user, wherein the one or more resources enable the user to execute the one or more actions.

20 Claims, 11 Drawing Sheets

SYSTEM FOR ALLOCATION OF RESOURCES BASED ON RESOURCE UTILIZATION

PRIORITY CLAIM

This non-provisional utility patent application claims the benefit under 35 U.S.C. § 119(e) of U.S. Provisional Application No. 62/300,227 titled "SYSTEM FOR ALLOCATION OF RESOURCES BASED ON RESOURCE UTILIZATION", filed Feb. 26, 2016.

BACKGROUND

Resource management is the efficient and effective development of an organization's resources. Most organizations strive to achieve maximum utilization of the resources weighted by important metrics and subject to predefined constraints at the smallest level of operation. However, allocation of these resources based on these constraints and metrics may post the challenge to any organization. There is a need for a system to allocate resources based on resource utilization and automate the process of allocation to avoid manual intervention.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for allocation of resources based on resource utilization is presented. The system comprising: at least one non-transitory storage device; at least one processor; and at least one module stored in said storage device and comprising instruction code that is executable by the at least one processor and configured to cause said at least one processor to: electronically receive information associated with a user, wherein the information comprises a primary user profile; determine one or more actions associated with the primary user profile, wherein the one or more actions are to be executed by the user; determine one or more resources required to execute the one or more actions based on at least the primary user profile; and assign the one or more resources to the user based on at least the primary user profile associated with the user, wherein the one or more resources enable the user to execute the one or more actions.

In some embodiments, the module is further configured to cause the at least one processor to: establish a communication link with a user device, wherein establishing further comprises creating a data channel between the at least one module and the user device; electronically track, via the established communication link, resource utilization of the user over a predetermined period of time; and determine a utilization score associated with each of the one or more resources based on at least tracking the resource utilization.

In some embodiments, the module is further configured to cause the at least one processor to: determine that the utilization score associated with at least one of the one or more resources is lower than a first predetermined threshold, wherein the first predetermined threshold indicates whether the utilization of the at least one of the one or more resources meets a minimum utilization requirement; and reallocate the at least one of the one or more resources based on at least determining that the utilization score is lower than the first predetermined threshold.

In some embodiments, the module is further configured to cause the at least one processor to: determine that the utilization score associated with at least one of the one or more resources is greater than a second predetermined threshold, wherein the second predetermined threshold indicates whether the utilization of the at least one of the one or more resources meets a maximum utilization requirement; and identify one or more additional resources to be allocated to the user based on at least determining that the at least one of the one or more resources meets a maximum utilization requirement; and allocate the one or more additional resources to the user.

In some embodiments, the module is further configured to cause the at least one processor to: identify a primary pattern associated with the resource utilization of the user based on at least tracking resource utilization of the user over a predetermined period of time.

In some embodiments, the module is further configured to cause the at least one processor to: receive, via the established communication link, one or more actions associated with the resource utilization of the user; and determine whether the one or more actions is within one or more rails associated with the identified primary pattern.

In some embodiments, the module is further configured to cause the at least one processor to: determine that the one or more actions is outside the one or more rails associated with the identified primary pattern; determine a secondary pattern associated with the resource utilization of the user, wherein the secondary pattern includes the one or more actions determined to be outside the one or more rails associated with the identified primary pattern; compare the secondary pattern with one or more user profiles to determine whether the secondary pattern matches one or more user profile characteristics; determine a secondary user profile to be associated with the user based on at least determining a match between the secondary pattern and the one or more user profile characteristics.

In some embodiments, the module is further configured to cause the at least one processor to: determine whether the one or more actions is outside the one or more rails associated with the identified primary pattern based on at least receiving static information associated with the user's resource utilization and dynamic information associated with the user's resource utilization.

In some embodiments, the module is further configured to cause the at least one processor to: determine one or more actions associated with the secondary user profile, wherein the one or more actions are to be executed by the user; determine one or more resources required to execute the one or more actions based on at least the secondary user profile; and assign the one or more resources to the user based on at least the secondary user profile associated with the user, wherein the one or more resources enable the user to execute the one or more actions.

In another aspect, a computer program product for allocation of resources based on resource utilization is presented. The computer program product comprising a non-transitory computer-readable medium comprising code causing a first apparatus to: electronically receive information associated with a user, wherein the information comprises a primary user profile; determine one or more actions associated with the primary user profile, wherein the one or more actions are to be executed by the user; determine one or more resources required to execute the one or more actions based on at least the primary user profile; and assign the one or more resources to the user based on at least the primary user profile associated with the user, wherein the one or more resources enable the user to execute the one or more actions.

In yet another aspect, a computer implemented method for allocation of resources based on resource utilization is presented. The method comprising: electronically receiving, using a computing device processor, information associated with a user, wherein the information comprises a primary user profile; determining, using a computing device processor, one or more actions associated with the primary user profile, wherein the one or more actions are to be executed by the user; determining, using a computing device processor, one or more resources required to execute the one or more actions based on at least the primary user profile; and assigning, using a computing device processor, the one or more resources to the user based on at least the primary user profile associated with the user, wherein the one or more resources enable the user to execute the one or more actions.

BRIEF DESCRIPTION OF THE DRAWINGS

Figure 1:
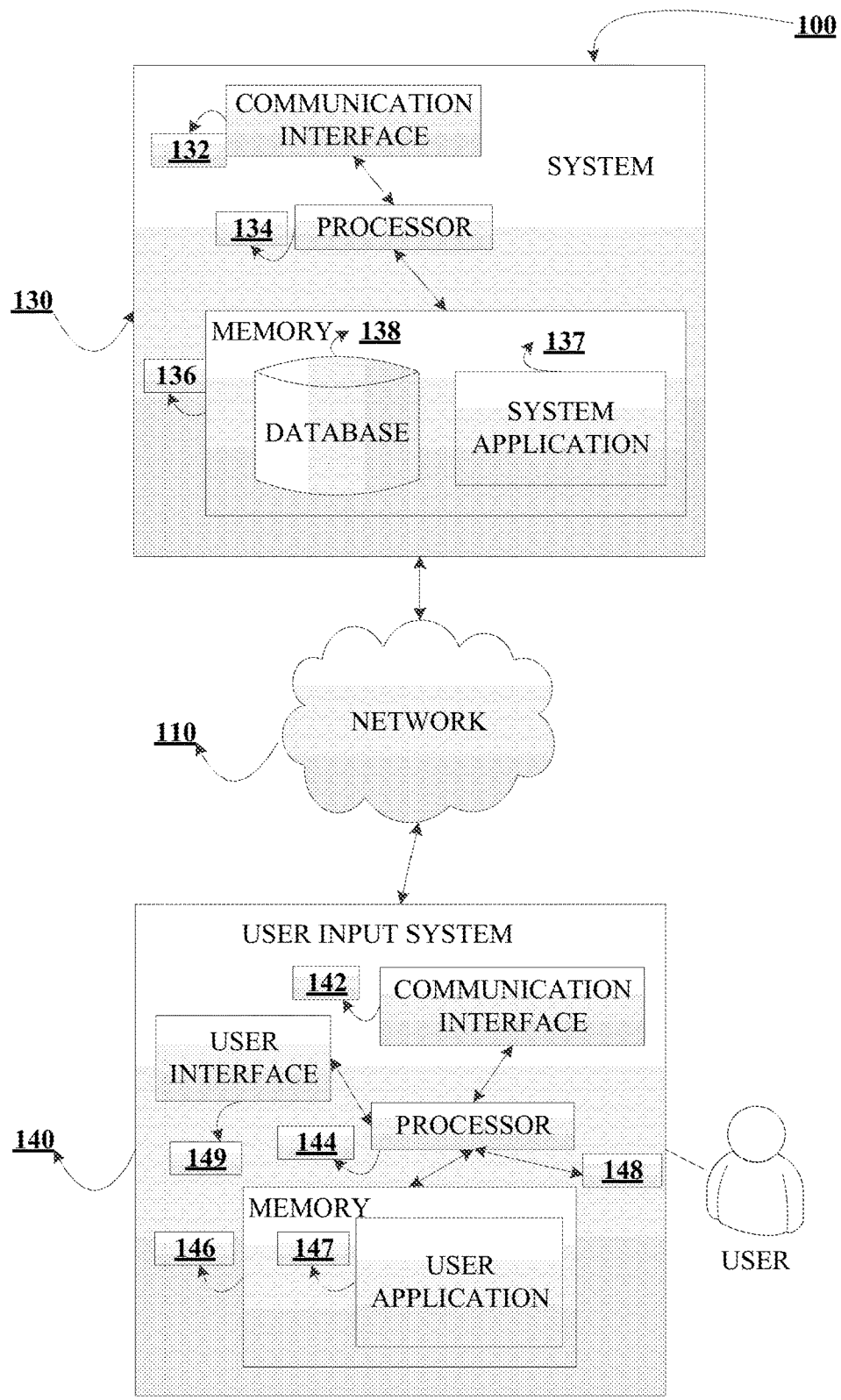
Figure 2:
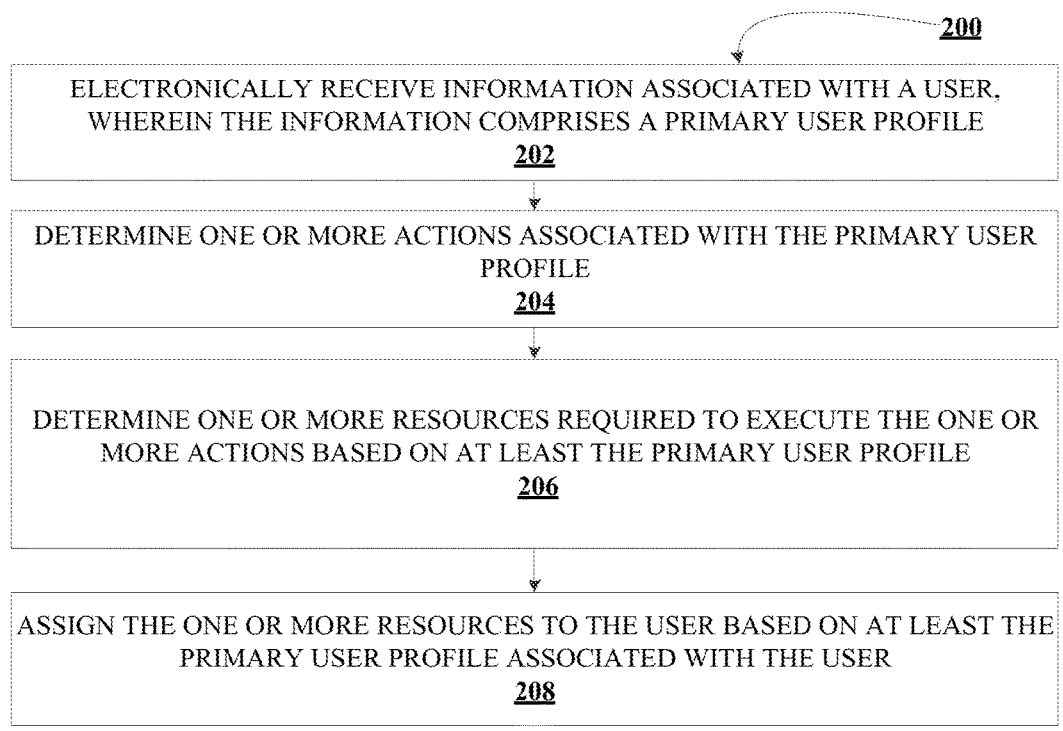
Figure 3:
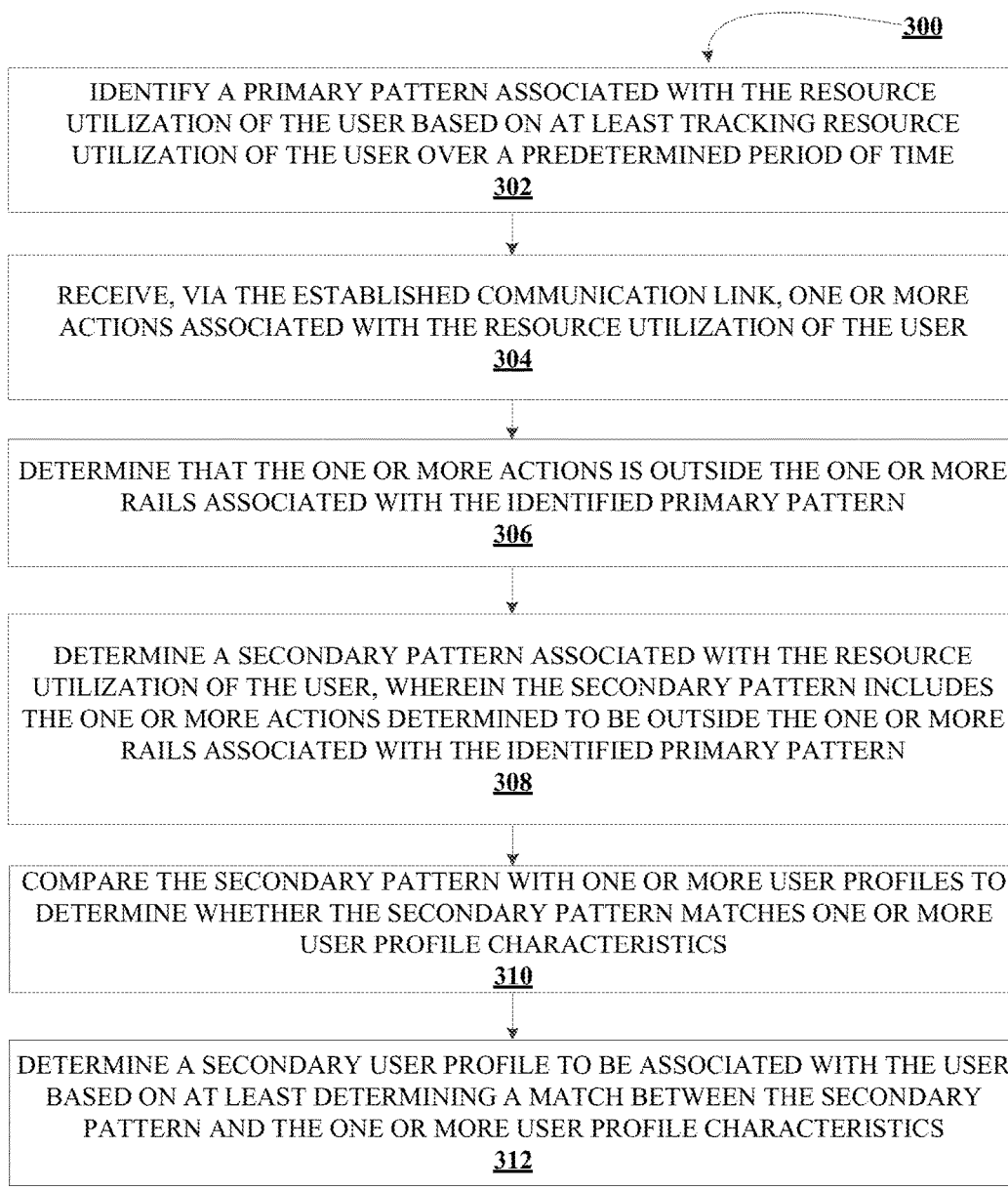

Having thus described embodiments of the invention in general terms, reference will now be made to the accompanying drawings, where:

FIG. 1 illustrates technical components of a system for allocation of resources based on resource utilization, in accordance with an embodiment of the invention;

FIG. 2 illustrates a general process flow for allocation of resources based on resource utilization, in accordance with an embodiment of the invention;

FIG. 3 illustrates a general process flow for reallocation of resources based on a detected pattern of utilization, in accordance with an embodiment of the invention;

FIGS. 4-10 illustrate exemplary user interfaces associated with tracking resource utilization and managing the allocation of resources, in accordance with an embodiment of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident; however, that such embodiment(s) may be practiced without these specific details. Like numbers refer to like elements throughout.

Embodiments of the invention are directed to systems, methods and computer program products for allocating resources based on resource utilization. The present invention enables an organization to track the utilization of resources at the lowest level in determining whether the resources used require reallocation accordingly. The present invention provides the functional benefit of identifying resource requirements and automatically determine the allocation of resources between users, groups, sub-groups, or the like within the organization. In doing so, the present invention provides tailored services by automating the provisioning of resources, consistently delivering, and seamlessly integrating with existing systems within the entity.

In some embodiments, an "entity" as used herein may refer to an organization comprising multiple individuals such as an institution or an association that has a collective goal and external environment. Typically, organizations have a management structure that determines relationships between different activities and the members, and subdivides and assigns roles, responsibilities, and authority to carry out different tasks. For purposes of the invention, resources may indicate one or more hardware and/or software available to the user and enables the user to work towards the collective goal of the entity.

In some embodiments, the "user" may be an individual who operates the user input system described herein and is associated with an entity under a contract of employment, either part-time or full-time.

A "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

FIG. 1 presents an exemplary block diagram of the system environment 100 for implementing the process flows described herein in accordance with embodiments of the present invention. As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute a user application 147. The user application 147 may be an application to communicate with the system 130, perform a transaction, input information onto a user interface presented on the user input system 140, or the like. The user application 147 and/or the system application 137 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

The user input system 140 may include any computerized apparatus that can be configured to perform any one or more of the functions of the user input system 140 described and/or contemplated herein. For example, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like. In some embodiments, for example, the user input system 140 may include a personal computer system (e.g. a non-mobile or non-portable computing system, or the like), a mobile computing device, a personal digital assistant, a mobile phone, a tablet computing device, a network device, and/or the like. As illustrated in FIG. 1, in accordance with some embodiments of the present invention, the user input system 140 includes a communication interface 142, a processor 144, a memory 146 having an user application 147 stored therein, and a user interface 149. In such embodiments, the communication interface 142 is operatively and selectively connected to the processor 144, which is operatively and selectively connected to the user interface 149 and the memory 146. In some embodiments, the user may use the user application 147 to execute processes described with respect to the process flows described herein. Specifically, the user application 147 executes the process flows described herein.

Each communication interface described herein, including the communication interface 142, generally includes hardware, and, in some instances, software, that enables the user input system 140, to transport, send, receive, and/or otherwise communicate information to and/or from the communication interface of one or more other systems on the network 110. For example, the communication interface 142 of the user input system 140 may include a wireless transceiver, modem, server, electrical connection, and/or other electronic device that operatively connects the user input system 140 to another system such as the system 130. The wireless transceiver may include a radio circuit to enable wireless transmission and reception of information. Additionally, the user input system 140 may include a positioning system. The positioning system (e.g. a global positioning system (GPS), a network address (IP address) positioning system, a positioning system based on the nearest cell tower location, or the like) may enable at least the user input system 140 or an external server or computing device in communication with the user input system 140 to determine the location (e.g. location coordinates) of the user input system 140.

Each processor described herein, including the processor 144, generally includes circuitry for implementing the audio, visual, and/or logic functions of the user input system 140. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory device, such as in the user application 147 of the memory 146 of the user input system 140.

Each memory device described herein, including the memory 146 for storing the user application 147 and other information, may include any computer-readable medium. For example, memory may include volatile memory, such as volatile random access memory (RAM) having a cache area for the temporary storage of information. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

As shown in FIG. 1, the memory 146 includes the user application 147. In some embodiments, the user application 147 includes an interface for communicating with, navigating, controlling, configuring, and/or using the user input system 140. In some embodiments, the user application 147 includes computer-executable program code portions for instructing the processor 144 to perform one or more of the functions of the user application 147 described and/or contemplated herein. In some embodiments, the user application 147 may include and/or use one or more network and/or system communication protocols.

Also shown in FIG. 1 is the user interface 149. In some embodiments, the user interface 149 includes one or more output devices, such as a display and/or speaker, for presenting information to the user. In some embodiments, the user interface 149 includes one or more input devices, such as one or more buttons, keys, dials, levers, directional pads, joysticks, accelerometers, controllers, microphones, touchpads, touchscreens, haptic interfaces, microphones, scanners, motion detectors, cameras, and/or the like for receiving information from the user. In some embodiments, the user interface 149 includes the input and display devices of a mobile device, which are operable to receive and display information.

FIG. 1 also illustrates a system 130, in accordance with an embodiment of the present invention. The system 130 may refer to the "apparatus" described herein. The system 130 may include any computerized apparatus that can be configured to perform any one or more of the functions of the system 130 described and/or contemplated herein. In accordance with some embodiments, for example, the system 130 may include a computer network, an engine, a platform, a server, a database system, a front end system, a back end system, a personal computer system, and/or the like. Therefore, the system 130 may be a server managed by the business. The system 130 may be located at the facility associated with the business or remotely from the facility associated with the business. In some embodiments, such as the one illustrated in FIG. 1, the system 130 includes a communication interface 132, a processor 134, and a memory 136, which includes a system application 137 and a structured database 138 stored therein. As shown, the communication interface 132 is operatively and selectively connected to the processor 134, which is operatively and selectively connected to the memory 136.

It will be understood that the system application 137 may be configured to implement any one or more portions of the various user interfaces and/or process flow described herein. The system application 137 may interact with the user application 147. It will also be understood that, in some embodiments, the memory includes other applications. It will also be understood that, in some embodiments, the system application 137 is configured to communicate with the structured database 138, the user input system 140, or the like.

It will be further understood that, in some embodiments, the system application 137 includes computer-executable program code portions for instructing the processor 134 to perform any one or more of the functions of the system application 137 described and/or contemplated herein. In some embodiments, the system application 137 may include and/or use one or more network and/or system communication protocols.

In addition to the system application 137, the memory 136 also includes the structured database 138. As used herein, the structured database 138 may be one or more distinct and/or remote databases. In some embodiments, the structured database 138 is not located within the system and is instead located remotely from the system. In some embodiments, the structured database 138 stores information or data described herein.

It will be understood that the structured database 138 may include any one or more storage devices, including, but not limited to, datastores, databases, and/or any of the other storage devices typically associated with a computer system. It will also be understood that the structured database 138 may store information in any known way, such as, for example, by using one or more computer codes and/or languages, alphanumeric character strings, data sets, figures, tables, charts, links, documents, and/or the like. Further, in some embodiments, the structured database 138 may include information associated with one or more applications, such as, for example, the system application 137. It will also be understood that, in some embodiments, the structured database 138 provides a substantially real-time representation of the information stored therein, so that, for example, when the processor 134 accesses the structured database 138, the information stored therein is current or substantially current.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

In addition, the various portions of the system environment 100 may be maintained for and/or by the same or separate parties. It will also be understood that the system 130 may include and/or implement any embodiment of the present invention described and/or contemplated herein. For example, in some embodiments, the system 130 is configured to implement any one or more of the embodiments of the process flows described and/or contemplated herein in connection any process flow described herein. Additionally, the system 130 or the user input system 140 is configured to initiate presentation of any of the user interfaces described herein.

FIG. 2 provides a high-level process flow for allocation of resources based on resource utilization 200, in accordance with an embodiment of the invention. As shown in block 202, the process flow includes electronically receiving information associated with the user, wherein the information comprises a primary user profile. Typically, a user profile can be used to describe the characteristics of a user and the user's role within the entity. This information can be used by systems taking into account the users' characteristics and preferences. Profiling the user typically refers to the construction of a profile via extraction from a set of data associated with the user. For example, the different types of user profiles may include, but not limited to executive, traveler, office worker, trader, business developer, call center, day extender, and/or the like. By associating the user with a user profile, the system may be configured to determine resource requirements associated with the user. In this regard, the system may be configured to determine one or more actions associated with the primary user profile, as shown in block 204. In some embodiments, the one or more actions are to be executed by the user. In this regard, the one or more actions may be associated with one or more responsibilities related to the user profile. For example, an action associated with a traveler (traveling employee) may be to communicate with the entity's facility periodically. In another example, an action associated with a business developer may be to develop reports related to a specialized application installed on the user input device.

Next, as shown in block 206, the process flow includes determining one or more resources required to execute the one or more actions based on at least the primary user profile. As described herein, the one or more resources may include hardware and/or software required by the user to execute the one or more actions. In response to determining the one or more resources, the process flow includes assigning the one or more resources to the user based on at least the primary user profile associated with the user, as shown in block 208. In some embodiments, the one or more resources enable the user to execute the one or more actions.

In some embodiments, the system may be configured to determine resource utilization associated with the user. In this regard, the system may be configured to establish a communication link with a user device (user input system) to create a data channel (wired or wireless) between the system and the user device. In doing so, the system may be able to electronically track the resource utilization of the user over a predetermined period of time. In some embodiments, tracking the resource utilization may include receiving information associated with the user and resource utilization habits of the user to execute one or more actions. In one aspect, the information may include, but is not limited to work details, organization, remote access needs, specialized computing needs, information sensitivity, and/or the like. In some embodiments, work details may include, but is not limited to location type, base location, job code, hierarchy, and/or the like. In some other embodiments, remote access needs include, but is not limited to location of remote use, frequency of remote use, mode of remote use, duration of remote use, or the like. In yet another embodiment, specialized computing needs include, but is not limited to computer performance, accessories, system availability and reliability, or the like. In yet another embodiment, information sensitivity includes, but is not limited to high-risk data, contacts type, security type, encryption technology used, or the like. In one aspect, the information associated with the user profile is static in nature, i.e. the nature of the information does not change over time. For example, information associated with the organization and work details of the user may be considered static information. In another aspect, information associated with the user profile is dynamic in nature, i.e. the nature of the information changes over time and use. For example, information associated with a user's remote access needs, specialized computing, and information sensitivity may be considered dynamic information. By identifying the static and dynamic information, the present invention may be used to provide an increasing level of sophistication in the definition and scope of end-user computing devices.

In response to tracking the resource utilization of the user, the system may be configured to determine a utilization score associated with each of the one or more resources. The utilization score typically provides an indication of whether the source is being used to its maximum potential. In this regard, the system may determine that the utilization score associated with at least one of the one or more resources is lower than a first predetermined threshold. In some embodiments, the first predetermined threshold may indicate whether the utilization of the at least one of the one or more resources meets a minimum utilization requirement. For example, a dictation software installed in the user device may require 60% of the device's available memory for functioning. If the dictation software remains active in the background of the user device unbeknownst to the user, may potentially cause latency in the user's device performance thereby reducing the efficiency of the user and performing an action. In this scenario, the system may be configured to establish a predetermined threshold associated with the utilization of the dictation software to justify the installation of the dictation software on the user device. In some embodiments, the minimum utilization requirement may be defined based on at least one or more characteristics of the one or more resources. For example, a resource that requires a large memory requirement for functioning may have a higher minimum utilization requirement. In response to determining that the utilization score is lower than the first predetermined threshold, the system may be configured to reallocate the at least one of the one or more resources. In this regard, the system may identify one or more features associated with the resource, and process the one or more features to determine a utilization score for each of the one or more features. In doing so, the system may be configured to deactivate specific features in an attempt to increase the overall utilization score associated with the resource. Continuing with the previous example, the system may be configured to deactivate one or more functionalities associated with the dictation software thereby reducing the load of the dictation software on the memory of the user device. In some other embodiments, the system may be configured to remove the resource from the user profile completely. For example, the system may be configured to completely uninstall the dictation software from the user device.

In some embodiments, the system may be configured to determine that the utilization score associated with at least one of the one or more resources is greater than the second predetermined threshold. In this regard, the predetermined threshold indicates whether the utilization of at least one of the one or more resources meets maximum utilization requirement. For example, the system may determine that an instant messaging software installed on the user device has a utilization score which indicates that the user constantly and consistently uses the software to communicate with other personnel. In response, the system may be configured to identify one or more additional resources to be allocated to the user based on at least determining that the at least one of the one or more resources meets a maximum utilization requirement and allocate the one or more additional resources to the user. Continuing the previous example, by determining that the user is consistently using an instant messaging software and emailing documentation to other personnel during the instant messaging session, the system may determine that the user may be benefited from a web conferencing software capable of handling both instant messaging sessions and capable of communicating documents and presentations simultaneously.

FIG. 3 illustrates a general process flow for reallocation of resources based on a detected pattern of utilization 300, in accordance with an embodiment of the invention. As shown in block 302, the process flow includes identifying a primary pattern associated with the resource utilization of the user based on at least tracking resource utilization of the user over a predetermined period of time. In some embodiments, the primary pattern is based on at least the user profile associated with the user. For example, a user with a profile of a business developer usually has high computing needs to execute specialized applications that run data analytics on a regular basis. However, a business developer may not require remote access or customer interaction. In this scenario, the system may define one or more rails for each user profile to determine whether the resource utilization of the user remains within the one or more rails of the primary pattern. Next, as shown in block 304, the system may then receive, via the established communication link, one or more actions associated with the resource utilization of the user. The one or more actions associated with the resource utilization of the user typically indicates the actions executed by the user using the one or more resources. For example, a traveling employee may communicate with personnel at a physical location associated with the entity using a corporate mobile device. In this case, the action therefore is the act of communicating with the personnel in the resource used to execute this action is the corporate mobile device.

Next, as shown in block 306, the process flow includes determining that the one or more actions is outside the one or more rails associated with the identified primary pattern. In this regard, the system may determine that a user associated with a particular user profile is executing one or more actions that is outside the rails of the primary pattern associated with the user profile. For example, the user with a profile of a day extender who primarily works in the office is expected to use resources and execute actions such as remote access that are within the rails of the primary pattern associated with that of the day extender. If the user then begins to execute actions such as running business and data analytics using specialized applications, the system may determine that the one or more actions are outside the rails of the primary pattern. In response, the process flow then includes determining a secondary pattern associated with the resource utilization of the user, wherein the secondary pattern includes one or more actions determined to be outside the one or more rails associated with the identified primary pattern, as shown in block 308. In this regard, the system may be configured to match the actions executed by the user with one or more rails associated with one or more other patterns. The system then determines a match indicating that the one or more actions lie within the rails of a secondary pattern. For example, a user who works at a call center and uses resources to execute actions such as customer interaction, sales, service and support may be determined to execute actions such as executing financial transactions using high demand applications.

Next, as shown in block 310, the process flow then includes comparing the secondary pattern with one or more user profiles to determine whether the secondary pattern matches one or more user profile characteristics continuing with the previous example, the user may have received a promotion within the entity and requires one or more additional resources to execute one or more actions associated with the profile of a trader more effectively. In some embodiments the one or more user profile characteristics may include the one or more actions associated with the user profile.

In response, the process flow includes determining a secondary user profile to be associated with the user based on at least determining a match between the secondary pattern and the one or more user profile characteristics, as shown in block 312. In this regard, the system may determine that the user is now a trader and no longer a call center employee. In some embodiments, the system may be configured to determine one or more actions associated with the secondary user profile, wherein the one or more actions are to be executed by the user. In response the system may determine one or more resources required to execute the one or more actions based on at least the secondary user profile. This is done in order to ensure that the user may execute the one or more actions more efficiently. The system may then be configured to assign the one or more resources to the user based on at least the secondary user profile associated with the user, wherein the one or more resources enable the user to execute the one or more actions.

Figure 4:
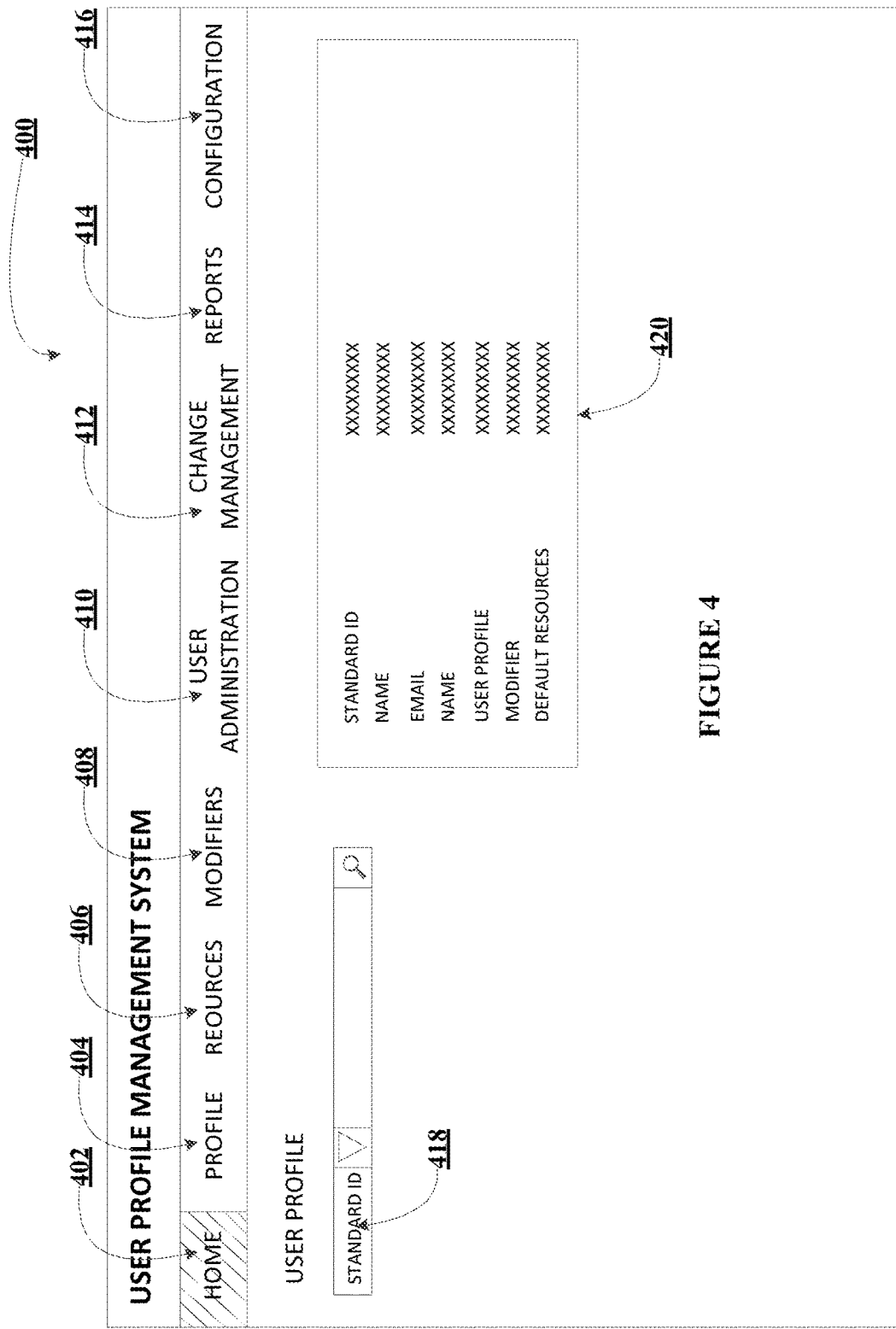
Figure 5:
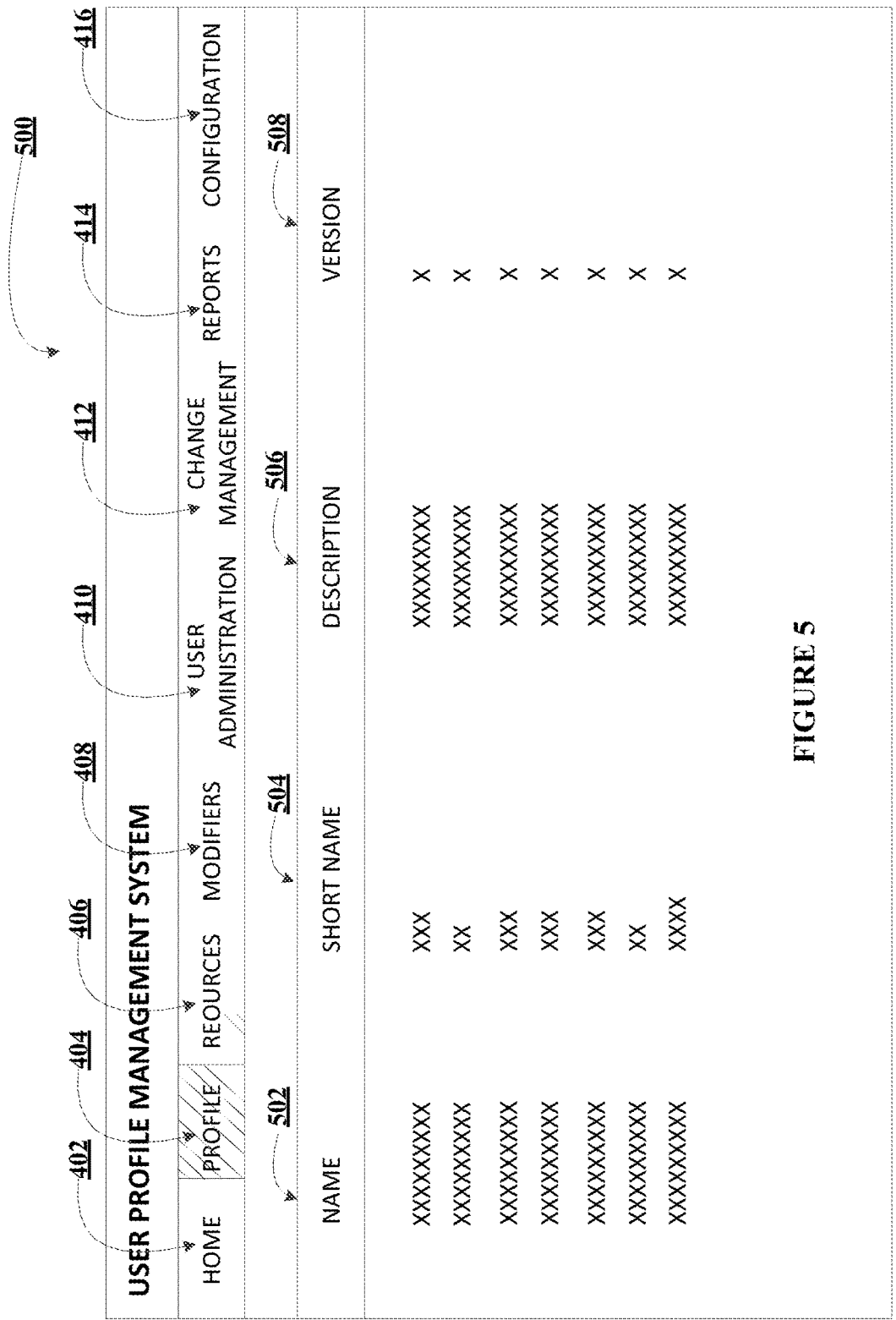
Figure 6A:
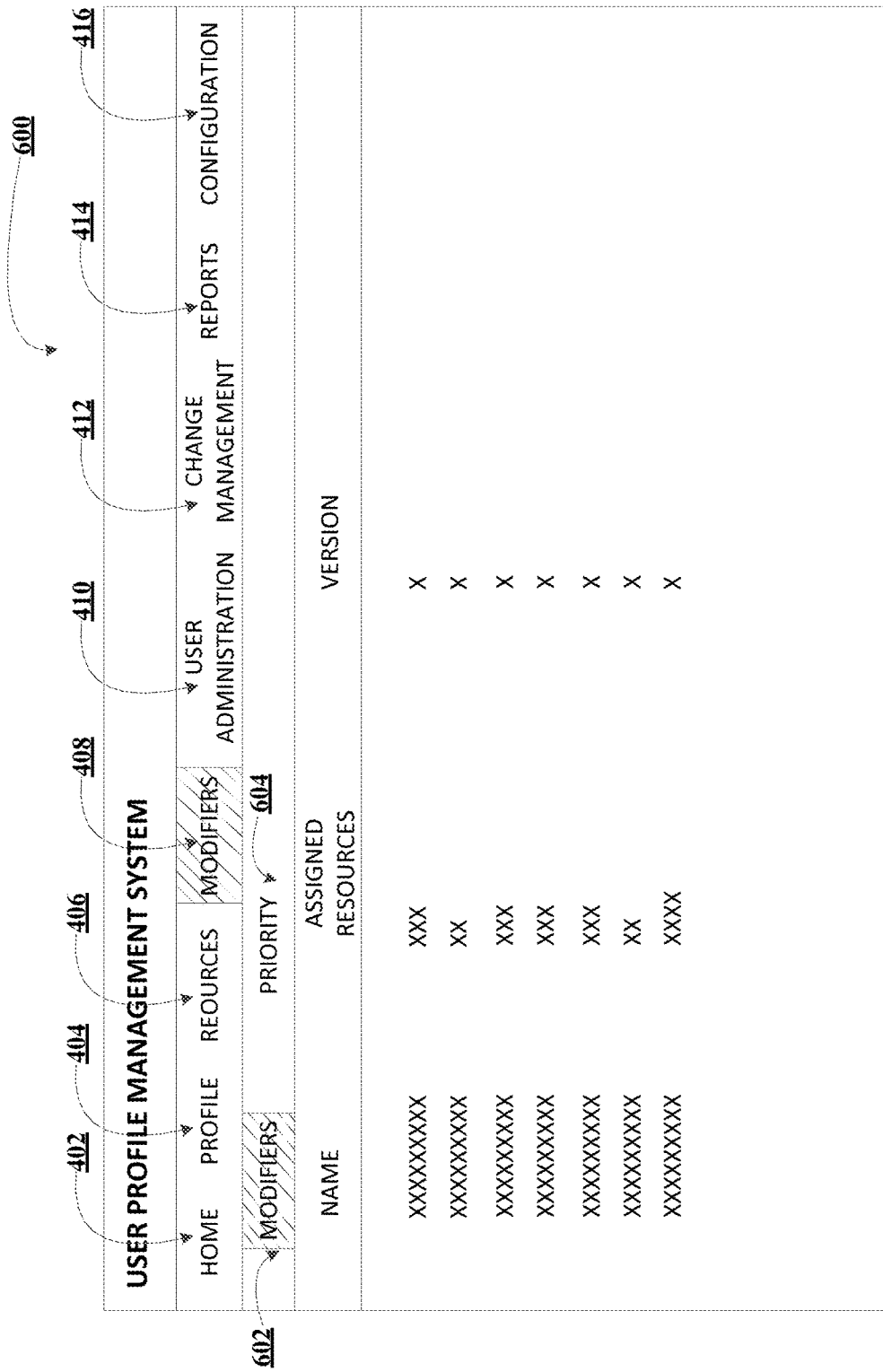
Figure 6B:
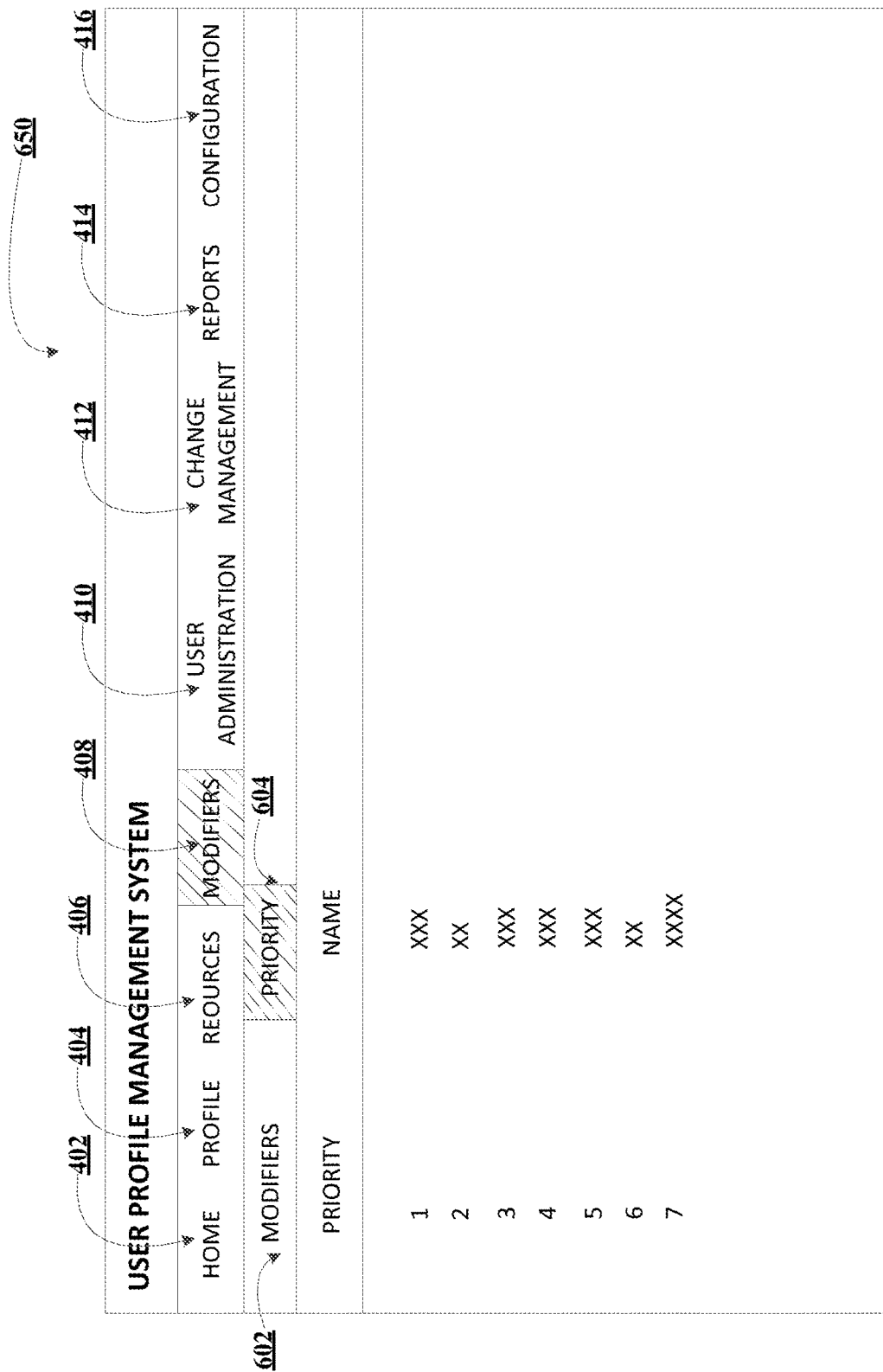
Figure 7:
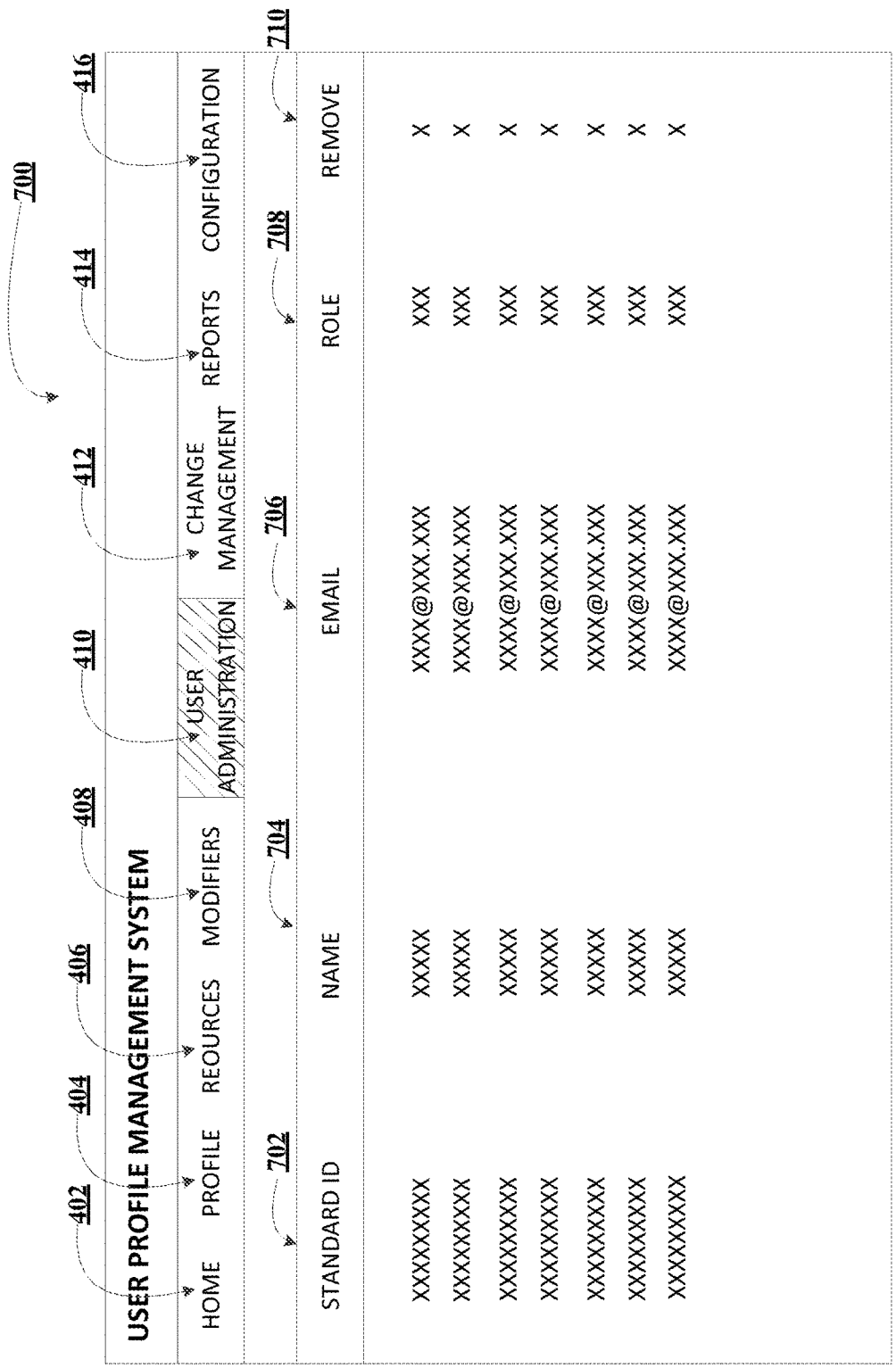
Figure 8:
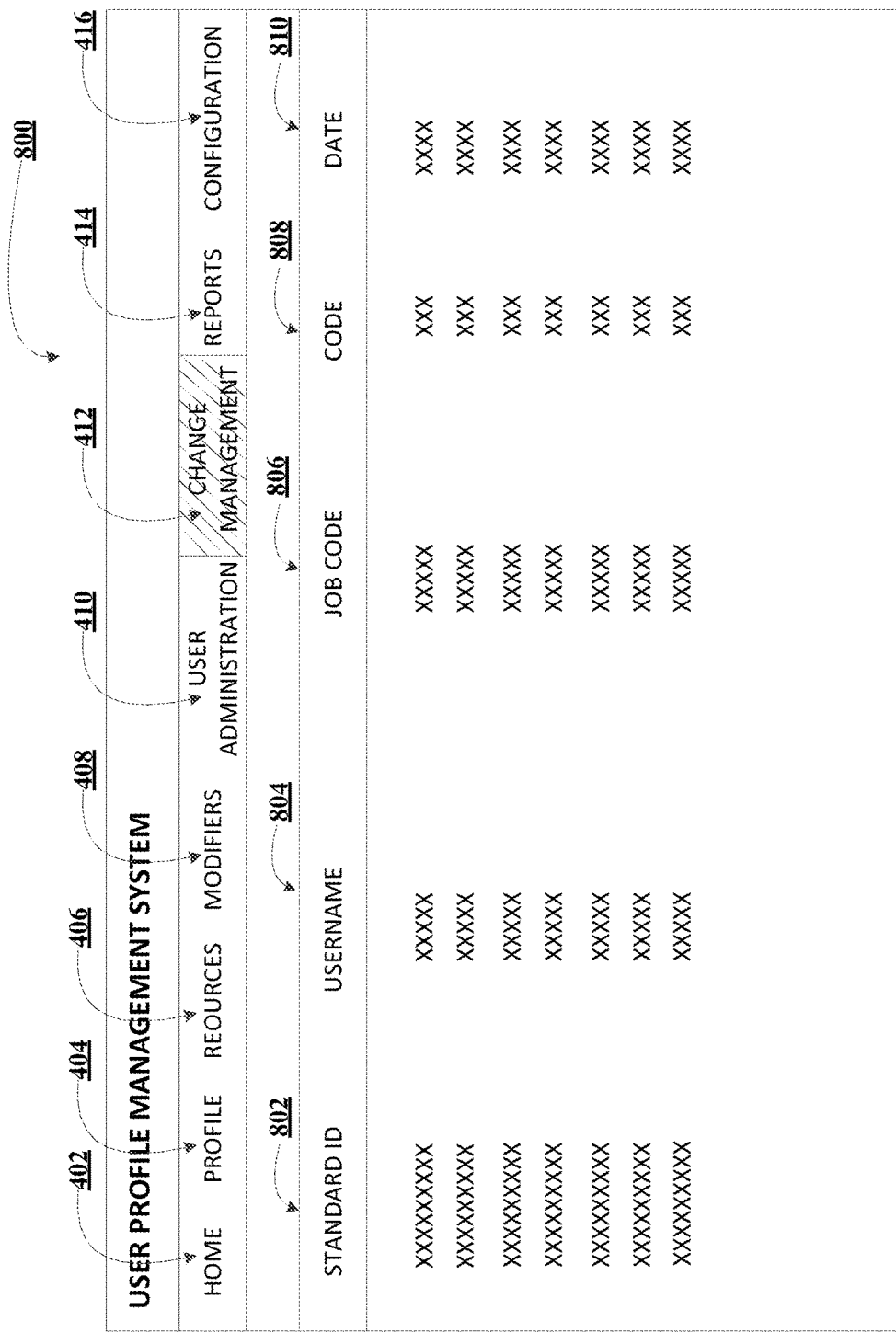
Figure 9:
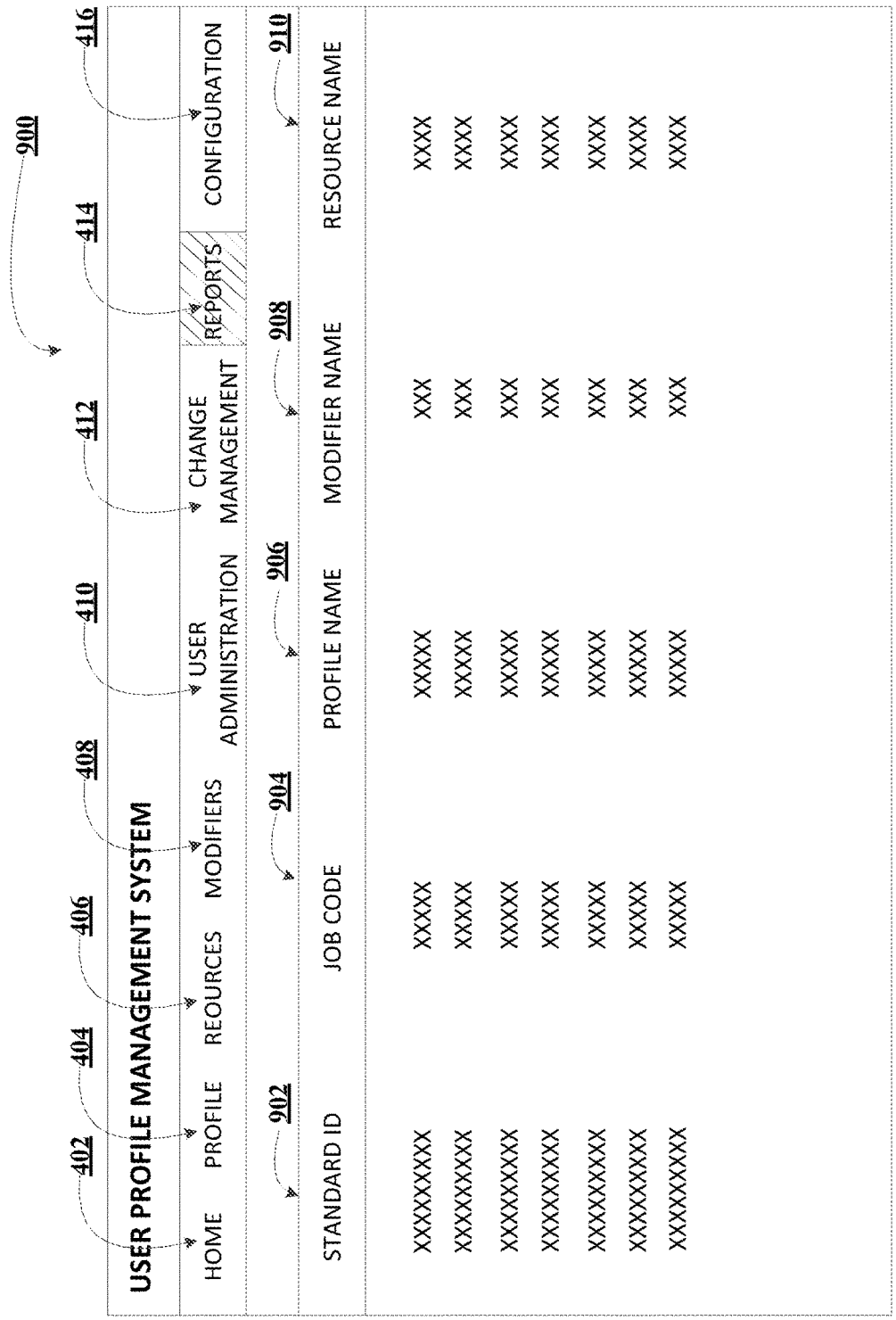
Figure 10:
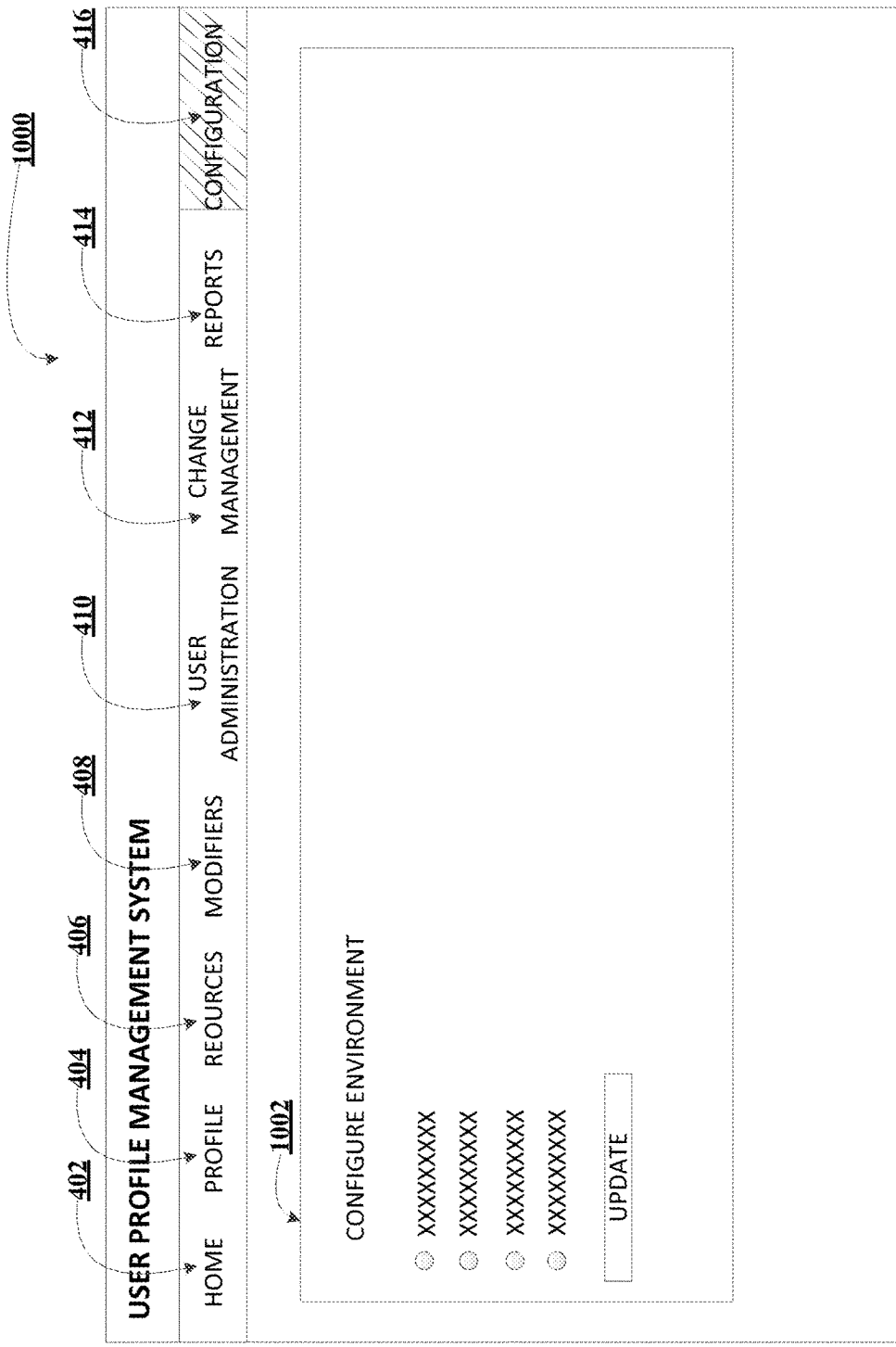

FIGS. 4-10 illustrate exemplary user interfaces associated with tracking resource utilization and managing the allocation of resources, in accordance with an embodiment of the invention. As shown in FIGS. 4-10, the user interfaces include one or more options including 402, profile 404, resources 406, modifiers 408, user administration 410, change management 412, reports 414 and configuration 416. FIG. 4 illustrates an option to select a user profile to be associated with a user. In this regard, the user profile may be selected using a standard identification (ID) 418 option. In some embodiments, the selection of a user profile may provide information associated with the user profile including, but not limited to standard ID, name, email, profile, modifier, or the like, as shown in 420. FIG. 5 illustrates a user interface indicating one or more user profiles and one or more actions associated with the user profiles capable of being searched, created, modified, and deleted 500. As shown in FIG. 5, the information associated with the user profiles include, but is not limited to name of the user profile 502, a short name 504, description 506, and version 508. FIG. 6A illustrates one or more modifiers 602 associated with each user profile and a priority 604 associated with each modifier 600. FIG. 6B illustrates one or more modifiers in order of their priority to establish a precedent order for the application of the one or more modifiers to the user profile 650. FIG. 7 illustrates an exemplary user interface for an administrator to manage access and control rights for one or more users based on their associated user profile 700. In this regard, FIG. 7 illustrates a standard ID 702, name 704, email 706, roll 708, and an option to remove or modify the user 710. FIG. 8 illustrates a user interface indicating change management reporting for employees or contractors who do not have an assigned user profile 800. In this regard, the user interface provides information associated with the users including, but not limited to standard ID 802, user name 804, job code 806, code 808, and date 810. FIG. 9 illustrates a user interface to report changes in the user profile providing detailed and summarized production changes and allows for modeling of proposed changes in test environments 900. In this regard, the user interface includes standard ID 902, job code 904, profile name 906, modifier name 908, and configuration 910. FIG. 10 illustrate the user interface to select the environment that will be compared in the reports interface illustrated in FIG. 9. In this regard, FIG. 10 illustrates a configuration environment to determine a format 1002 associated with the reporting period.

In some embodiments, the one or more resources may not be associated with the user. In this regard, the one or more resources may be devices configured to execute one or more actions autonomously. In one aspect, these devices may be configured to perform actions associated with business continuity executing day-to-day operations. In another aspect, these devices may be configured to perform actions associated with research and development. Typically, these devices may be configured to perform any action required by the entity and operate autonomously, i.e. without user intervention. In this regard, the system may be configured to receive a device profile associated with each device. In this regard, the device profile may indicate one or more actions to be executed by the device and the one or more resources required by the device to execute the one or more actions. As described herein, the one or more resources may be any hardware and/or software associated with the device and enabling the device to execute the one or more actions. Examples of these devices may include but is not limited to, network printers, personal computers, virtual machines, and/or one or more professional service systems capable of tracking real-time data feeds across the entity.

In some embodiments, the system may be configured to track the resource utilization of each of these devices and identify patterns associated with the resource utilization to determine whether each device is performing at maximum capacity. As described herein, the system may be configured to determine a utilization score for each device and determine whether the devices are being used efficiently. In this regard, the system may be configured to determine whether the devices need to be replaced, upgraded, or reallocated according to its utilization to increase utilization efficiency.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:
1. A system for allocation of resources based on resource utilization, the system comprising:
   at least one non-transitory storage device; and
   at least one processing device coupled to the at least one non-transitory storage device, wherein the at least one processing device is configured to:
      electronically receive information associated with a user, wherein the information comprises a primary user profile;
      determine one or more actions associated with the primary user profile, wherein the one or more actions are to be executed by the user;
      determine one or more resources required to execute the one or more actions based on at least the primary user profile;
      assign the one or more resources to the user based on at least the primary user profile associated with the user, wherein the one or more resources enable the user to execute the one or more actions;
      electronically track a resource utilization by the user of the one or more resources assigned to the user over a predetermined period of time;
      determine a utilization score associated with each of the one or more resources based on at least tracking the resource utilization;
      identify a primary pattern associated with the resource utilization of the user based on at least tracking resource utilization of the user over a predetermined period of time;
      determine that one or more actions executed by the user on the one or more resources assigned to the user is outside one or more rails associated with the identified primary pattern;
      determine a secondary pattern associated with the resource utilization of the user, wherein the secondary pattern includes the one or more actions determined to be outside the one or more rails associated with the identified primary pattern;
      compare the secondary pattern with one or more user profiles to determine whether the secondary pattern matches one or more user profile characteristics;

determine a secondary user profile to be associated with the user based on at least determining a match between the secondary pattern and the one or more user profile characteristics.

2. The system of claim 1, wherein the system is further configured to:
   determine that the utilization score associated with at least one of the one or more resources is lower than a first predetermined threshold, wherein the first predetermined threshold indicates whether the utilization of the at least one of the one or more resources meets a minimum utilization requirement; and
   reallocate the at least one of the one or more resources based on at least determining that the utilization score is lower than the first predetermined threshold.

3. The system of claim 1, wherein the system is further configured to:
   determine that the utilization score associated with at least one of the one or more resources is greater than a second predetermined threshold, wherein the second predetermined threshold indicates whether the utilization of the at least one of the one or more resources meets a maximum utilization requirement; and
   identify one or more additional resources to be allocated to the user based on at least determining that the at least one of the one or more resources meets a maximum utilization requirement; and
   allocate the one or more additional resources to the user.

4. The system of claim 1, wherein the system is further configured to:
   receive one or more actions associated with the resource utilization of the user; and
   determine whether the one or more actions is within the one or more rails associated with the identified primary pattern.

5. The system of claim 1, wherein the system is further configured to:
   determine whether the one or more actions is outside the one or more rails associated with the identified primary pattern based on at least receiving static information associated with the user's resource utilization and dynamic information associated with the user's resource utilization.

6. The system of claim 1, wherein the system is further configured to:
   determine one or more actions associated with the secondary user profile, wherein the one or more actions are to be executed by the user;
   determine one or more resources required to execute the one or more actions based on at least the secondary user profile; and
   assign the one or more resources to the user based on at least the secondary user profile associated with the user, wherein the one or more resources enable the user to execute the one or more actions.

7. The system of claim 1, wherein the one or more resources comprises at least hardware and/or software required by the user to execute the one or more actions.

8. A computer program product for allocation of resources based on resource utilization, the computer program product comprising a non-transitory computer-readable medium comprising code causing a first apparatus to:
   electronically receive information associated with a user, wherein the information comprises a primary user profile;
   determine one or more actions associated with the primary user profile, wherein the one or more actions are to be executed by the user;
   determine one or more resources required to execute the one or more actions based on at least the primary user profile;
   assign the one or more resources to the user based on at least the primary user profile associated with the user, wherein the one or more resources enable the user to execute the one or more actions;
   electronically track a resource utilization by the user of the one or more resources assigned to the user over a predetermined period of time;
   determine a utilization score associated with each of the one or more resources based on at least tracking the resource utilization;
   identify a primary pattern associated with the resource utilization of the user based on at least tracking resource utilization of the user over a predetermined period of time;
   determine that one or more actions executed by the user on the one or more resources assigned to the user is outside one or more rails associated with the identified primary pattern;
   determine a secondary pattern associated with the resource utilization of the user, wherein the secondary pattern includes the one or more actions determined to be outside the one or more rails associated with the identified primary pattern;
   compare the secondary pattern with one or more user profiles to determine whether the secondary pattern matches one or more user profile characteristics;
   determine a secondary user profile to be associated with the user based on at least determining a match between the secondary pattern and the one or more user profile characteristics.

9. The computer program product of claim 8 comprising code causing the first apparatus to:
   determining that the utilization score associated with at least one of the one or more resources is lower than a first predetermined threshold, wherein the first predetermined threshold indicates whether the utilization of the at least one of the one or more resources meets a minimum utilization requirement; and
   reallocating the at least one of the one or more resources based on at least determining that the utilization score is lower than the first predetermined threshold.

10. The computer program product of claim 8 comprising code causing the first apparatus to:
    determining that the utilization score associated with at least one of the one or more resources is greater than a second predetermined threshold, wherein the second predetermined threshold indicates whether the utilization of the at least one of the one or more resources meets a maximum utilization requirement; and
    identifying one or more additional resources to be allocated to the user based on at least determining that the at least one of the one or more resources meets a maximum utilization requirement; and
    allocating the one or more additional resources to the user.

11. The computer program product of claim 8 comprising code causing the first apparatus to:
    receiving one or more actions associated with the resource utilization of the user; and
    determining whether the one or more actions is within one or more rails associated with the identified primary pattern.

12. The computer program product of claim 8 comprising code causing the first apparatus to:
  determining whether the one or more actions is outside the one or more rails associated with the identified primary pattern based on at least receiving static information associated with the user's resource utilization and dynamic information associated with the user's resource utilization.

13. The computer program product of claim 8 comprising code causing the first apparatus to:
  determining one or more actions associated with the secondary user profile, wherein the one or more actions are to be executed by the user;
  determining one or more resources required to execute the one or more actions based on at least the secondary user profile; and
  assigning the one or more resources to the user based on at least the secondary user profile associated with the user, wherein the one or more resources enable the user to execute the one or more actions.

14. The computer program product of claim 8 comprising code causing the first apparatus to:
  determining that the utilization score associated with at least one of the one or more resources is greater than a second predetermined threshold, wherein the second predetermined threshold indicates whether the utilization of the at least one of the one or more resources meets a maximum utilization requirement; and
  identifying one or more additional resources to be allocated to the user based on at least determining that the at least one of the one or more resources meets a maximum utilization requirement; and
  allocating the one or more additional resources to the user.

15. The computer program product of claim 8 comprising code causing the first apparatus to:
  receiving one or more actions associated with the resource utilization of the user; and
  determining whether the one or more actions is within one or more rails associated with the identified primary pattern.

16. The computer program product of claim 8 comprising code causing the first apparatus to:
  determining whether the one or more actions is outside the one or more rails associated with the identified primary pattern based on at least receiving static information associated with the user's resource utilization and dynamic information associated with the user's resource utilization.

17. The computer program product of claim 8 comprising code causing the first apparatus to:
  determining one or more actions associated with the secondary user profile, wherein the one or more actions are to be executed by the user;
  determining one or more resources required to execute the one or more actions based on at least the secondary user profile; and
  assigning the one or more resources to the user based on at least the secondary user profile associated with the user, wherein the one or more resources enable the user to execute the one or more actions.

18. The computer program product of claim 8, wherein hardware and/or software required by the user to execute the one or more actions.

19. A computer implemented method for allocation of resources based on resource utilization, the method comprising:
  electronically receiving, using a computing device processor, information associated with a user, wherein the information comprises a primary user profile;
  determining, using a computing device processor, one or more actions associated with the primary user profile, wherein the one or more actions are to be executed by the user;
  determining, using a computing device processor, one or more resources required to execute the one or more actions based on at least the primary user profile;
  assigning, using a computing device processor, the one or more resources to the user based on at least the primary user profile associated with the user, wherein the one or more resources enable the user to execute the one or more actions;
  electronically tracking, using a computing device processor, a resource utilization by the user of the one or more resources assigned to the user over a predetermined period of time;
  determining, using a computing device processor, a utilization score associated with each of the one or more resources based on at least tracking the resource utilization;
  identifying, using a computing device processor, a primary pattern associated with the resource utilization of the user based on at least tracking resource utilization of the user over a predetermined period of time;
  determining, using a computing device processor, that one or more actions executed by the user on the one or more resources assigned to the user is outside one or more rails associated with the identified primary pattern;
  determining, using a computing device processor, a secondary pattern associated with the resource utilization of the user, wherein the secondary pattern includes the one or more actions determined to be outside the one or more rails associated with the identified primary pattern;
  comparing, using a computing device processor, the secondary pattern with one or more user profiles to determine whether the secondary pattern matches one or more user profile characteristics; and
  determining, using a computing device processor, a secondary user profile to be associated with the user based on at least determining a match between the secondary pattern and the one or more user profile characteristics.

20. The method of claim 19, wherein the method further comprises:
  determining that the utilization score associated with at least one of the one or more resources is lower than a first predetermined threshold, wherein the first predetermined threshold indicates whether the utilization of the at least one of the one or more resources meets a minimum utilization requirement; and
  reallocating the at least one of the one or more resources based on at least determining that the utilization score is lower than the first predetermined threshold.

* * * * *